United States Patent
Oura et al.

(10) Patent No.: US 12,287,592 B2
(45) Date of Patent: Apr. 29, 2025

(54) IMAGE FORMING METHOD AND IMAGE FORMING SYSTEM

(71) Applicant: Konica Minolta, Inc., Tokyo (JP)

(72) Inventors: Kazumi Oura, Sagamihara (JP); Hiroshi Nagasawa, Hino (JP); Masaharu Matsubara, Hachioji (JP); Koji Shibata, Hachioji (JP); Akihiko Itami, Hino (JP); Makoto Nomiya, Tokyo (JP); Natsuki Ito, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/591,850

(22) Filed: Feb. 29, 2024

(65) Prior Publication Data
US 2024/0302769 A1    Sep. 12, 2024

(30) Foreign Application Priority Data
Mar. 3, 2023    (JP) .................. 2023-032678

(51) Int. Cl.
*G03G 15/16*    (2006.01)
*C04B 35/47*    (2006.01)
*G03G 9/08*    (2006.01)
*G03G 21/00*    (2006.01)

(52) U.S. Cl.
CPC ......... *G03G 15/1605* (2013.01); *C04B 35/47* (2013.01); *G03G 9/0819* (2013.01); *G03G 21/0005* (2013.01); *G03G 2215/0861* (2013.01)

(58) Field of Classification Search
CPC ............ G03G 9/0819; G03G 15/1605; G03G 21/0005; G03G 2215/0861; C04B 35/47
See application file for complete search history.

(56) References Cited

U.S. PATENT DOCUMENTS

| | | |
|---|---|---|
| 2022/0276577 A1* | 9/2022 | Takahashi .......... G03G 21/1814 |
| 2023/0350315 A1* | 11/2023 | Kojima .............. G03G 21/1814 |
| 2023/0350317 A1* | 11/2023 | Shinozuka ......... G03G 21/1814 |

FOREIGN PATENT DOCUMENTS

JP    2022-132142 A    9/2022

* cited by examiner

*Primary Examiner* — Hoang X Ngo
(74) *Attorney, Agent, or Firm* — LUCAS & MERCANTI, LLP

(57) ABSTRACT

Disclosed is an image forming method including: developing, with an electrostatic charge image developing toner, a latent image formed on a photoreceptor in which a photosensitive layer is formed on a support containing aluminum as a main component; transferring a toner image on the photoreceptor onto a transfer target; and rubbing and removing the electrostatic charge image developing toner remaining on the photoreceptor after the transferring. The support contains silicon in a range of more than 0.6% by mass and 12.6% by mass or less, a shape factor of toner particles included in the electrostatic charge image developing toner is in a range of 0.800 to 0.970, and a content of the toner particles having a particle diameter of 2 μm or less is in a range of 5% by number to 30% by number.

7 Claims, 2 Drawing Sheets

IMAGE FORMING METHOD AND IMAGE FORMING SYSTEM

REFERENCE TO RELATED APPLICATIONS

The entire disclosure of Japanese Patent Application No. 2023-032678, filed on Mar. 3, 2023, including description, claims, drawings and abstract is incorporated herein by reference in its entirety.

BACKGROUND OF THE INVENTION

Technical Field

The present invention relates to an image forming method and an image forming system. The present invention relates to an image forming method and the like capable of ensuring good cleaning performance even in the case of an aluminum support containing a large amount of silicon.

Description Of Related Art

With improvement in performance of an image forming apparatus using an electrophotographic method, an image having relatively high image quality has been obtained. Thus, image forming apparatuses using an electrophotographic method have been widely used in the field of light printing in which a relatively small number of prints are obtained. As a result, an image forming apparatus using an electrophotographic method is required to have a higher level of image quality.

In addition, an image forming apparatus using electrophotography has been conventionally used for rare applications. Examples of the applications include printing on coated paper, printing of a high-coverage image, printing of an extremely high-definition image or an image having a delicate tone (color tone), and mass continuous printing of the same image.

On the other hand, an aluminum support used in an electrophotographic photoreceptor contains a wrought material. Due to the effect of such a wrought material, crystal grains in the aluminum support may have random sizes. When image formation is repeatedly performed, a difference in electron flowability between crystal grains becomes significant, and there is a problem in that unevenness in potential in a plane direction occurs. Therefore, a technology improved by controlling the distribution of crystalline areas of crystalline grains in an aluminum support has been disclosed (see, for example, Japanese Unexamined Patent Publication No. 2022-132142).

In addition to the above, a problem caused by the wrought material in the aluminum support is considered. In particular, in an aluminum support in which a large amount of a wrought material is present, it is assumed that defects and image defects are generated due to the generation of protrusions of crystals.

SUMMARY OF THE INVENTION

The present invention has been made in view of the above-mentioned problems and circumstances, and the problems to be solved are as follows. An object of the present invention is to provide an image forming method and an image forming system capable of ensuring good cleaning performance even in the case of an aluminum support containing a large amount of silicon.

The present inventors have found the importance of defining the shape factor of toner particles and the content of toner particles having a particle diameter of 2 μm or less in the process of studying the causes of the above problems in order to solve the above problems.

That is, the above-described problems may be solved by the following means.

To achieve at least one of the abovementioned objects, according to an aspect of the present invention, there is provided an image forming method including: developing, with an electrostatic charge image developing toner, a latent image formed on a photoreceptor in which a photosensitive layer is formed on a support containing aluminum as a main component; transferring a toner image on the photoreceptor onto a transfer target; and rubbing and removing the electrostatic charge image developing toner remaining on the photoreceptor after the transferring, wherein the support contains silicon in a range of more than 0.6% by mass and 12.6% by mass or less, a shape factor of toner particles included in the electrostatic charge image developing toner is in a range of 0.800 to 0.970, and a content of the toner particles having a particle diameter of 2 μm or less is in a range of 5% by number to 30% by number.

To achieve at least one of the abovementioned objects, according to another aspect of the present invention, there is provided an image forming system including: a photoreceptor in which a photosensitive layer is formed on a support containing aluminum as a main component; a developer that develops, with an electrostatic charge image developing toner, a latent image formed on the photoreceptor; a transferer that transfers a toner image on the photoreceptor onto a transfer target; and a cleaner that rubs and removes the electrostatic charge image developing toner remaining on the photoreceptor after transferring; and an electrostatic charge image developing toner, wherein the support contains silicon in a range of more than 0.6% by mass and 12.6% by mass or less, a shape factor of toner particles included in the electrostatic charge image developing toner is in a range of 0.800 to 0.970, and a content of the toner particles having a particle diameter of 2 μm or less is in a range of 5% by number to 30% by number.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein.

DETAILED DESCRIPTION

Figure 1:
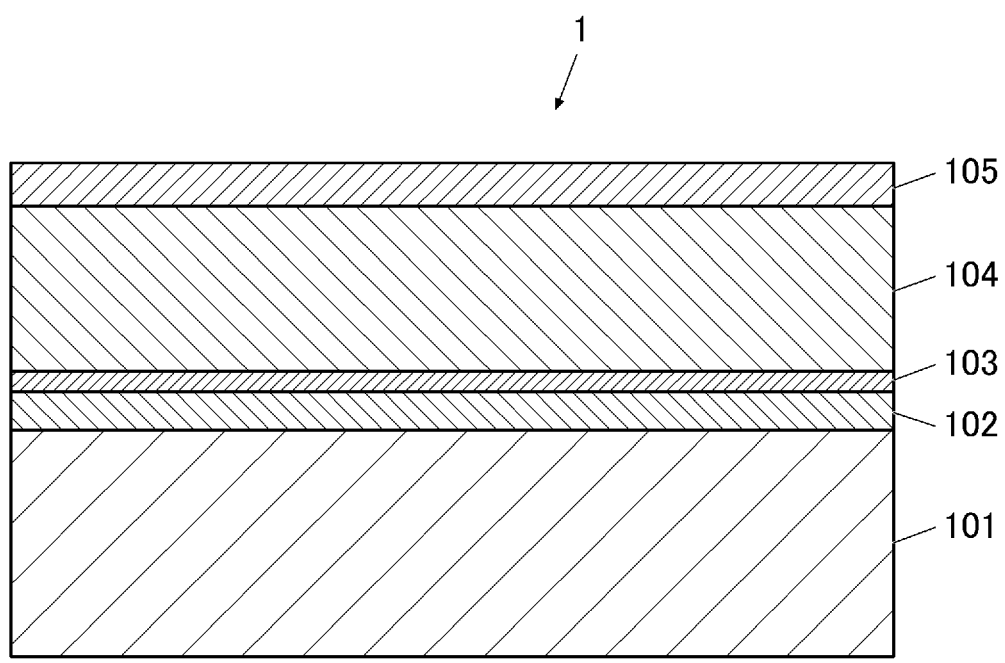
FIG. 1 is a view illustrating an example of a layer configuration of an electrophotographic photoreceptor.

Hereinafter, one or more embodiments of the present invention will be described with reference to the drawings. However, the scope of the invention is not limited to the disclosed embodiments.

The image forming method of the present invention includes developing a latent image formed on a photoreceptor having a photosensitive layer formed on a support containing aluminum as a main component with an electrostatic charge image developing toner, transferring a toner image on the photoreceptor onto a transfer target, and removing the electrostatic charge image developing toner remaining on the photoreceptor after transfer by rubbing, wherein the support contains silicon in a range of more than 0.6% by mass and 12.6% by mass or less, a shape factor of toner particles contained in the electrostatic charge image developing toner is in a range of 0.800 to 0.970, and a content of the toner particles having a particle diameter of 2 μm or less is in a range of 5 to 30% by number.

This feature is a technical feature common to or corresponding to the following embodiments.

In an embodiment of the present invention, the toner particles preferably have a shape factor in a range of 0.930 to 0.970. As a result, the toner particles tend to stay between the cleaning blade and the photoreceptor, and the cleaning performance is improved by the polishing effect.

The toner particles preferably contain strontium titanate. The strontium titanate particle has a rectangular parallelepiped shape having a sharp edge. Therefore, the polishing force can be more effectively exhibited by combining the toner particle having the specific shape factor with the strontium titanate.

The support preferably contains silicon in a range of 0.8 to 12.6% by mass, and more preferably in a range of 1.3 to 12.6% by mass. In particular, the support preferably contains silicon in a range of 1.3 to 2.0% by mass, which is an appropriate range for forming protrusions from silicon crystals.

An image forming system of the present invention includes a photoreceptor in which a photosensitive layer is formed on a support containing aluminum as a main component, a developer that develops a latent image formed on the photoreceptor with an electrostatic charge image developing toner, a transferer that transfers a toner image on the photoreceptor onto a transfer target, a cleaner for rubbing and removing the electrostatic charge image developing toner remaining on the photoreceptor after the transfer, and an electrostatic charge image developing toner, wherein the support contains silicon in a range of more than 0.6% by mass and 12.6% by mass or less, a shape factor of toner particles included in the electrostatic charge image developing toner is in a range of 0.800 to 0.970, and a content of the toner particles having a particle diameter of 2 μm or less is in a range of 5 to 30% by number.

As a result, it is possible to provide an image forming system capable of ensuring good cleaning performance even when the support is made of aluminum containing a large amount of silicon.

Hereinafter, the present invention, constituent elements thereof, and modes and aspects for carrying out the present invention will be described. In the present description, when two figures are used to indicate a range of value before and after "to", these figures are included in the range as a lower limit value and an upper limit value.

[Outline of Image Forming Method of the Present Invention] The image forming method of the present invention includes developing a latent image formed on a photoreceptor having a photosensitive layer formed on a support containing aluminum as a main component with an electrostatic charge image developing toner, transferring a toner image on the photoreceptor onto a transfer target, and removing the electrostatic charge image developing toner remaining on the photoreceptor after transfer by rubbing, wherein the support contains silicon in a range of more than 0.6% by mass and 12.6% by mass or less, a shape factor of toner particles contained in the electrostatic charge image developing toner is in a range of 0.800 to 0.970, and a content of the toner particles having a particle diameter of 2 μm or less is in a range of 5 to 30% by number.

Note that hereinafter, an "electrophotographic photoreceptor" is also referred to simply as a "photoreceptor".

Furthermore, the "electrostatic charge image developing toner" is also simply referred to as "toner". The toner includes toner particles each including a toner base particle and an external additive disposed on a surface of the toner base particle.

In the present specification, the term "toner base particle" refers to a base of a "toner particle". The "toner base particles" according to the present invention contain at least a binding resin, and may contain other constituent components, such as a colorant, a release agent (wax), and a charge control agent, if necessary. The "toner base particles" are referred to as "toner particles" by addition of an external additive. The term "toner" refers to an aggregate of toner particles.

The support according to the present invention contains aluminum (Al) as a main component.

In addition, "containing aluminum as a main component" means that the content of Al is 80% by mass or more with respect to the total mass of the entire support. In particular, the content of Al is preferably in a range of 85 to 99% by mass with respect to the total mass of the entire support.

Furthermore, the support according to the present invention contains silicon (Si).

An appropriate range of the silicon content is more than 0.6% by mass and 12.6% by mass or less relative to the total mass of the entire support. The content of silicon is preferably in a range of 0.8 to 12.6% by mass, more preferably in a range of 1.3 to 12.6% by mass, and still more preferably in a range of 1.3 to 2.0% by mass.

In a case where the silicon content in the support is 0.6% by mass or less, there are few protrusions derived from silicon crystals, and image defects hardly occur. On the other hand, when the silicon ratio is more than 12.6%, since it is a eutectic system having a eutectic point at 12.6%, coarse crystals end up being mixed in, leading to image defects.

If the silicon content is lower within the appropriate range, the number of protrusions derived from silicon crystals decreases, making it difficult to achieve the effect. On the other hand, when the content is large, crystals tend to become large, and therefore, an effect of polishing force is hardly obtained.

The support is preferably made of an aluminum alloy, and may contain Fe, Cu, Mn, Mg, Ti, and the like in addition to Al and Si.

Preferably, relative to the total mass of the entire support, Fe is 0.7% by mass or less, Cu is in a range of 0.05 to 0.2% by mass, Mn is 0.9% by mass or less, Ti, Zn, and Cr are 0.1% by mass or less.

In the present invention, the "aluminum alloy" refers to an alloy in which the content of aluminum (Al) is 50% by mass or more with respect to the entire alloy.

<Shape Factor of Toner Particle>

The toner used in the image forming method of the present invention has a shape factor of the toner particles in the range of 0.800 to 0.970. The shape factor is more preferably in a range of 0.930 to 0.970.

The shape factor of the toner particles indicates the degree of roundness of the toner particles. The shape factor is calculated by taking a photograph of a toner particle magnified 2000 times with a scanning electron microscope and analyzing the image using an image processing analyzer "LUZEX AP" (manufactured by Nireco Corporation).

At this time, a toner particle which is not entirely seen, such as a toner particle overlapping with a lower portion of another toner particle or a toner particle at an end of the field of view, is excluded. Then, 100 toner particles are randomly selected from among those in which the entire particles are visible and subjected to measurement. Note that toner particles excluding fine particles of 2 μm or less are targeted. From the photographic image obtained above, the shape factor is calculated by the following formula.

Shape factor=(Perimeter of circle having the same projected area as particle image)/(Perimeter of particle projection image)

After the shape factor is calculated for one hundred toner particles, the average shape factor is calculated. The average shape factor is an arithmetic average value obtained by adding the shape factors of the respective particles and dividing the sum by the total number of the measured particles. This average shape factor is defined as the shape factor of the toner particle of the present invention. The average shape factor in an example described later was also calculated by the above-described method.

In addition to the above-described method, for example, measurement can also be performed using a flow-type particle image analyzer "FPIA 3000" (manufactured by Sysmex Corporation).

The control range of the shape factor of the toner particles greatly varies depending on the type of the pulverizing apparatus. In order to decrease the shape factor of the toner particles, a jet mill is preferably used. In order to increase the shape factor of the toner particles, a mechanical pulverizer (T-250, manufactured by Turbo Kogyo Co., Ltd) is preferably used.

When a jet mill is used, the shape factor can be controlled by adjusting air flow conditions such as the temperature of cold air.

Similarly, when a turbo mill is used, the shape factor can be controlled by adjusting the air flow requirements such as the cold air temperature.

In both of the jet mill and the turbo mill, the lower the temperature, the lower the shape factor.

As the cold air, dehumidified dry air is preferably used. Since dew condensation occurs by lowering the temperature, it is necessary to use dry air.

As the air flow condition of the jet mill, the cold air temperature is preferably in the range of −15 to 5° C.

As an airflow condition of the turbo mill, a cold air temperature is preferably in a range of −15 to 5° C.

In addition, the shape factor of the toner particles can be further increased by carrying out treatment with a spheronization treatment apparatus in order to advance the spheronization. Examples of the spheronization treatment apparatus include ANGMILL (manufactured by Hosokawa Micron Corporation).

When the temperature is increased, since softening of the resin occurs, the shape of the toner particle becomes round, that is, the shape factor increases.

<Fine Powder Content>

In the toner according to the present invention, a content of toner particles having a particle diameter of 2 μm or less is in a range of 5 to 30% by number. The content of the toner particles having a particle diameter of 2 μm or less is more preferably in a range of 10 to 20% by number.

In the present invention, the "fine powder content" refers to the content of the toner particles having a particle diameter of 2 μm or less in the entire toner particles.

The fine powder content is measured as follows.

An SEM photograph of the toner enlarged to 2000 times is captured using a scanning electron microscope, and the photograph is observed. At this time, 100 toner particles are selected at random from among toner particles of which the entirety is visible, except for toner particles of which the entirety is not visible, such as toner particles overlapping with the lower portion of other toner particles or toner particles at the end of the field of view.

Next, the number of toner particles having a particle diameter of 2 μm or less is counted. Next, the ratio of the number of toner particles having a particle diameter of 2 μm or less to the total number (one hundred) of toner particles is calculated. The calculated proportion of the number (% by number) was defined as the fine powder content. The fine powder content in Examples described later was also calculated by the above-described method.

Note that the particle diameter of the toner particles is calculated by analyzing the image of the photograph using an image processing analyzer "LUZEX AP" (manufactured by Nireco Corporation). The Heywood diameter is calculated, and the number of toner particles having a diameter of 2 μm or less is counted as described above.

The Heywood diameter refers to a diameter of a circle having the same projected area as a particle image, that is, an equivalent circle diameter.

The content of the fine powder can be controlled by the difference in classification performance of a classifier. Specifically, when a "zigzag classifier" is used, it is difficult to perform precise classification, and the fine powder content becomes about several tens of percent. On the other hand, when a high-speed rotor classifier "turbo classifier" is used, the fine powder can be largely reduced, and the content of the fine powder can be made to be about several percent.

Hereinafter, the photoreceptor used in the image forming method of the present invention will be described.

[Layer Configuration of Photoreceptor] The photoreceptor used in the image forming method of the present invention has a configuration in which a photosensitive layer is laminated on a support. The photoreceptor preferably includes an intermediate layer between the support and the photosensitive layer.

The photosensitive layer may have a single-layer structure containing a charge generating compound and a charge transporting compound. Furthermore, the photosensitive layer may have a stacked structure of a charge generating layer containing a charge generating compound and a charge transport layer containing a charge transporting compound.

Furthermore, the photoreceptor according to the present invention preferably has a surface protective layer on the photosensitive layer.

The layer configuration of the photoreceptor may be, for example, as in the following (1) to (4).
(1) Support/intermediate layer/charge generating layer/ charge transport layer
(2) Support/intermediate layer/single-layer photosensitive layer
(3) Support/intermediate layer/charge generating layer/ charge transport layer/surface protective layer
(4) Support/intermediate layer/single-layer photosensitive layer/surface protective layer FIG. 1 is a diagram illustrating an exemplary layer configuration of a photoreceptor. In the photoreceptor 1 illustrated in FIG. 1, an intermediate layer 102, a charge generating layer 103, a charge transport layer 104, and a surface protective layer 105 are sequentially laminated on a support 101.

<Support>

As described above, the support according to the present invention contains Al as a main component. Further, the support contains Si. The content of Si is in a range of more than 0.6% by mass and 12.6% by mass or less with respect to the total mass of the support.

As a method for producing the support, a method in which the support is cut into a predetermined length through hot extrusion and cold drawing, and the surface is subjected to precision processing is general.

The support preferably has a thickness in a range of 0.5 to 5.0 mm.

<Intermediate Layer>

The photoreceptor according to the present invention preferably includes an intermediate layer between the support and the photosensitive layer. As a result, it is possible to impart a function of preventing a charge leak spot which may be generated by crystals derived from the alloy component to the photoreceptor.

The intermediate layer is, for example, a layer containing a binder resin, and if necessary, conductive particles or metal oxide particles. The binder resin contained in the intermediate layer is hereinafter also referred to as a "binder resin for an intermediate layer".

Examples of the binder resins for intermediate layers include casein; polyvinyl alcohol; nitrocellulose; ethylene-acrylic acid copolymer; polyamide resin; polyurethane resin and gelatin. Among these, alcohol-soluble polyamide resins are preferable.

The intermediate layer may contain various conductive particles or metal oxide particles for the purpose of resistance adjustment.

As the metal oxide particles, for example, various metal oxide particles such as alumina, zinc oxide, titanium oxide, tin oxide, antimony oxide, indium oxide, bismuth oxide, and zirconium oxide can be used. Particles of composite metal oxides such as tin-doped indium oxide and antimony-doped tin oxide may also be used.

The number-average primary particle diameter of the metal oxide particles is preferably 10 to 300 nm, and more preferably 20 to 100 nm.

One type of conductive particle or metal oxide particle may be used alone, or two or more types may be used in combination. When two or more of them are mixed, they may be in the form of a solid solution or fusion.

The content ratio of the conductive particles or the metal oxide particles is preferably in a range of 20 to 400 parts by mass, and more preferably in a range of 50 to 350 parts by mass with respect to 100 parts by mass of the binder resin.

The thickness of the intermediate layer is preferably in a range of 0.1 to 15 μm, and more preferably in a range of 0.3 to 10 μm.

<Photosensitive Layer>

The photosensitive layer may have a single-layer structure containing a charge generating compound and a charge transporting compound. Furthermore, the photosensitive layer may have a stacked structure of a charge generating layer containing a charge generating compound and a charge transport layer containing a charge transporting compound.

(Charge Generating Layer)

The charge generating layer is a layer containing a charge generating compound and a binder resin. The binder resin contained in the charge generating layer is hereinafter also referred to as a "binder resin for a charge generating layer".

"Charge generating compound" refers to a compound that exhibits the ability to generate charge carriers, i.e., electrons or holes. Examples of the charge generating compound include azo pigments such as Sudan Red and Diane Blue, quinone pigments such as pyrenequinone and anthanthrone, quinocyanine pigments, and perylene pigments. Furthermore, examples of the charge generating compound include, but are not limited to, indigo pigments such as indigo and thioindigo, polycyclic quinone pigments such as pyranthrone and diphthaloylpyrene, and phthalocyanine pigments. Among these, a polycyclic quinone pigment, a titanyl phthalocyanine pigment, and gallium phthalocyanine are preferable as the charge generating compound. These charge generating compounds may be used alone or in combination of two or more.

As the binder resin for a charge generating layer, a known resin can be used. Examples of the known resins include, but are not limited to, polystyrene resin; polyethylene resin; polypropylene resin; acrylic resin; methacrylic resin; vinyl chloride resin; vinyl acetate resin; polyvinyl butyral resin; epoxy resin; polyurethane resin; phenol resin; polyester resin; alkyd resin; polycarbonate resin; silicone resin; melamine resin; and copolymer resins containing two or more of these resins (e.g; vinyl chloride-vinyl acetate copolymer resin; vinyl chloride-vinyl acetate-maleic anhydride copolymer resin) and poly-vinylcarbazole resins. Among these, as the known resin, a polyvinyl butyral resin is preferable.

The content ratio of the charge generating compound in the charge generating layer is preferably in the range of 1 to 600 parts by mass relative to 100 parts by mass of the binder resin for a charge generating layer. The content ratio of the charge generating compound is more preferably in a range of 50 to 500 parts by mass.

The thickness of the charge generating layer varies depending on the characteristics of the charge generating compound, the characteristics of the binder resin for a charge generating layer, the content ratio, and the like, but is preferably in the range of 0.01 to 5 μm. The thickness of the charge generating layer is more preferably in a range of 0.05 to 3 μm.

(Charge Transport Layer)

The charge transport layer is a layer containing a charge transporting compound and a binder resin. The binder resin contained in the charge transport layer is hereinafter also referred to as a "binder resin for a charge transport layer".

The "charge transporting compound" refers to a compound exhibiting a transporting property of charge carriers, that is, electrons or holes. As the charge transporting compound, a known charge transporting compound can be used. Examples of the known charge transporting compound include for example, carbazole derivatives, Oxazole Derivatives, Oxadiazole Derivatives, Thiazole Derivatives, Thiadiazole Derivatives, triazole derivatives, Imidazole Derivatives, imidazolone derivatives, imidazolidine derivatives, bisimidazolidine derivatives, Styryl Compounds, Hydrazone Compounds, Pyrazoline Compounds, oxazolone derivatives, benzimidazole derivatives, quinazoline derivatives, benzofuran derivatives, Acridine Derivatives, phenazine derivatives, aminostilbene derivatives, triarylamine derivatives, phenylenediamine derivatives, stilbene derivatives, benzidine derivatives, Poly-N-vinylcarbazole, poly-1-vinylpyrene, poly-9-vinylanthracene, and triphenylamine derivatives. These may be used as a mixture of two or more thereof.

Preferable examples of the charge transporting compound used in the photoreceptor for short-wave exposure, such as short-wave laser, are illustrated below.

[Formula 1]

| Compound Example | Structure | Molecular Weight |
|---|---|---|
| CTM-31 | | 626.87 |
| CTM-32 | | 779.06 |
| CTM-33 | | 807.12 |
| CTM-34 | | 779.06 |

In addition, preferable examples of the charge transporting compound used in a photoreceptor for long-wave exposure using a long-wave laser or the like are exemplified below.

[Formula 2]
| Compound Example | Structure | Molecular Weight |
|---|---|---|
| CTM-41 | 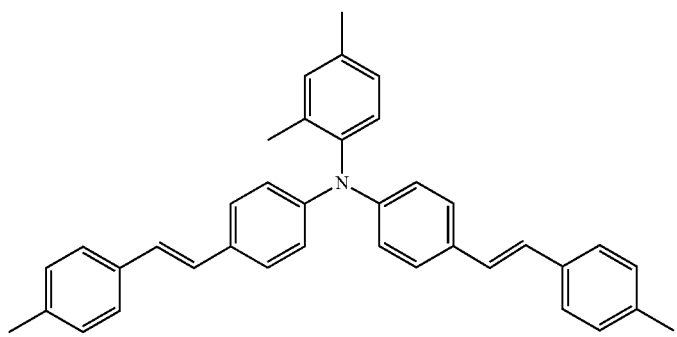 | 505.69 |
| CTM-42 | 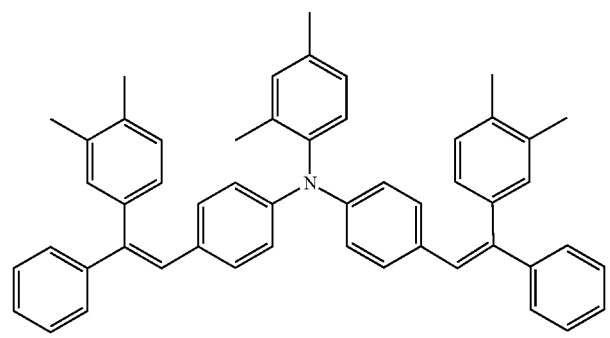 [SMILES: Cc1ccc(N(c2ccc(/C=C(/c3ccccc3)c3ccc(C)c(C)c3)cc2)c2ccc(/C=C(/c3ccccc3)c3ccc(C)c(C)c3)cc2)c(C)c1] | 685.94 |
| CTM-43 | 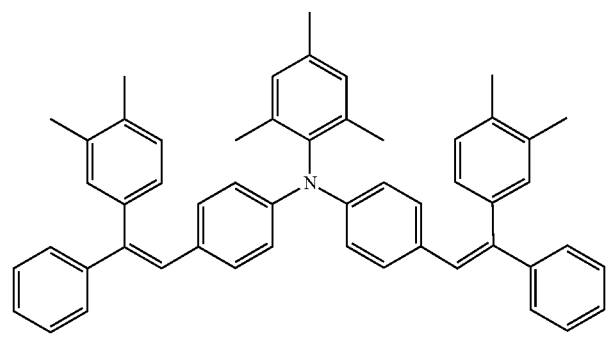 [SMILES: Cc1cc(C)c(N(c2ccc(/C=C(/c3ccccc3)c3ccc(C)c(C)c3)cc2)c2ccc(/C=C(/c3ccccc3)c3ccc(C)c(C)c3)cc2)c(C)c1] | 699.96 |
| CTM-44 | 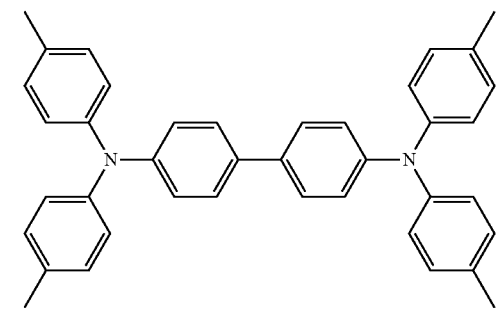 [SMILES: Cc1ccc(N(c2ccc(C)cc2)c2ccc(-c3ccc(N(c4ccc(C)cc4)c4ccc(C)cc4)cc3)cc2)cc1] | 544.73 |

[Formula 2]

| Compound Example | Structure | Molecular Weight |
|---|---|---|
| CTM-45 | 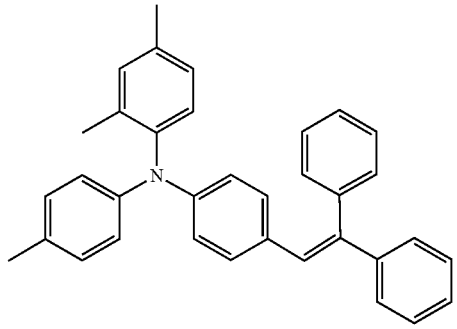 [SMILES: Cc1ccc(N(c2ccc(C=C(c3ccccc3)c3ccccc3)cc2)c2ccc(C)cc2C)cc1] | 465.63 |

[Formula 3]

| Compound Example | Structure | Molecular Weight |
|---|---|---|
| CTM-46 | 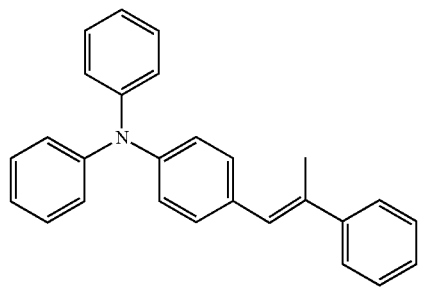 [SMILES: C/C(=C\c1ccc(N(c2ccccc2)c2ccccc2)cc1)c1ccccc1] | 361.48 |

Further, as the charge transporting compound contained in the charge transport layer, the following compounds can also be suitably used.

[Formula 4]

CTM-47

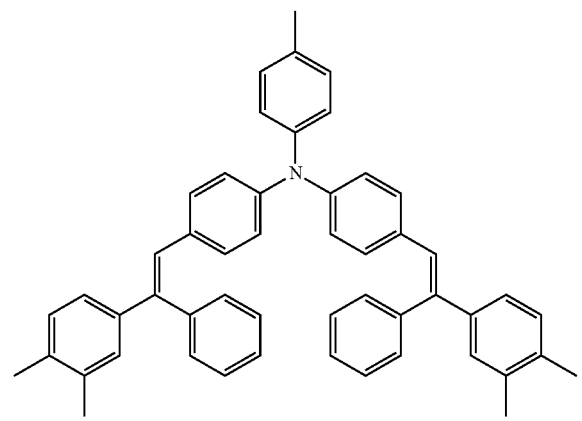

CTM-48

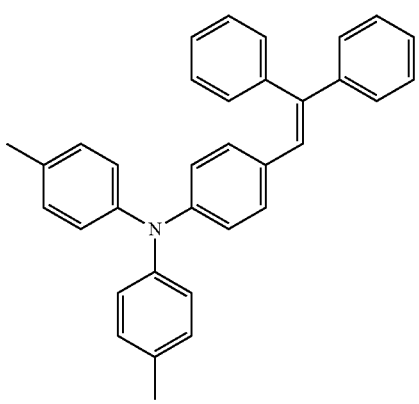

The charge transporting compound can be synthesized by a known synthesis method, for example, a synthesis method described in Japanese Unexamined Patent Publication No. 2010-26428, and Japanese Unexamined Patent Publication No. 2010-91707.

As the binder resin for the charge transport layer, a known resin can be used. Examples of the known resin include a polycarbonate resin, a polyacrylate resin, a polyester resin, a polystyrene resin, a styrene-acrylonitrile copolymer resin, a polymethacrylate resin, and a styrene-methacrylate copolymer resin. Among these, a polycarbonate resin is preferable as the known resin. Furthermore, BPA, BPZ, dimethyl BPA, a BPA-dimethyl BPA copolymer, and the like are preferable in terms of crack resistance, abrasion resistance, and chargeability.

The content ratio of the charge transporting compound in the charge transport layer is preferably 10 to 500 parts by mass, and more preferably 20 to 250 parts by mass, relative to 100 parts by mass of the binder resin for a charge transport layer.

The charge transport layer may contain an antioxidant, an electron conductive agent, a stabilizer, silicone oil, and the like. As the anti-oxidant, those disclosed in Japanese Unexamined Patent Publication No. 2000-305291, are preferable, and as the electronic conductive agent, those disclosed in Japanese Unexamined Patent Publication No. S 50-137543, 58-76483 and the like are preferable.

The thickness of the charge transport layer varies depending on the characteristics of the charge transporting compound, the characteristics of the binder resin, the mixing ratio, and the like, but is preferably in a range of 5 to 40 μm, more preferably in a range of 10 to 30 μm.

(Photosensitive Layer Having a Single-Layer Structure)

The single-layer photosensitive layer contains a charge-generating compound and a charge-transporting compound, and may contain components that may be contained in the charge generating layer and the charge transport layer.

When the photosensitive layer has a single-layer structure, charge generation occurs mainly in the vicinity of the surface of the photosensitive layer. Thus, the toner is less likely to be influenced by a charge leakage spot which may be generated due to crystals derived from an alloy component of the support, and image failure is less likely to occur. In addition, when the photosensitive layer has a single-layer structure, there is also an advantage that the photoreceptor can be produced at low cost.

The thickness of the photosensitive layer having a single layer structure varies depending on the characteristics of the charge generating compound, the characteristics of the charge transporting compound, the characteristics of the binder resin, the mixing ratio, and the like, but is preferably in the range of 5 to 40 μm. The thickness of the photosensitive layer is more preferably in a range of 10 to 30 μm.

<Surface Protective Layer>

The surface protective layer is a layer containing a cured product of a composition for forming a surface protective layer.

The photoreceptor of the present invention preferably has a surface protective layer. Thus, increase of the surface roughness due to long-term use can be prevented, and lowering of the cleaning performance can be suppressed.

The composition for forming a surface protective layer is a composition containing a polymerizable compound and a charge transporting compound, or a composition containing a charge transporting compound which itself is a polymerizable compound. The composition for forming a surface protective layer may contain a charge transporting compound which itself is a polymerizable compound and another polymerizable compound.

The cured product of the composition is a cured product obtained by polymerization of the polymerizable compound in the composition to form a matrix.

The "charge transporting compound" refers to a compound exhibiting a transporting property of charge carriers, that is, electrons or holes. An example of the charge transporting compound includes any known charge transporting compound can be used, for example, carbazole derivatives, Oxazole Derivatives, Oxadiazole Derivatives, Thiazole Derivatives, Thiadiazole Derivatives, Triazole Derivatives, Imidazole Derivatives, imidazolone derivatives, imidazolidine derivatives, bisimidazolidine derivatives, Styryl Compounds, Hydrazone Compound, Pyrazoline Compounds, oxazolone derivatives, Benzimidazole Derivatives, Quinazoline Derivatives, benzofuran derivatives, Acridine Derivatives, phenazine derivatives, aminostilbene derivatives, triarylamine derivatives, phenylenediamine derivatives, stilbene derivatives, Benzidine Derivatives, Poly-N-vinylcarbazole, poly-1-vinylpyrene, poly-9-vinylanthracene, and triphenylamine derivatives. These may be used as a mixture of two or more thereof.

The term "polymerizable compound" refers to a compound having a functional group capable of reacting by chain polymerization. As the functional group capable of reacting by chain polymerization, an acryloyloxy group ($CH_2$=CHCOO—) or a methacryloyloxy group ($CH_2$=C($CH_3$)COO—) is preferable.

The composition for forming a surface protective layer preferably contains a polymerization initiator.

The polymerization initiator is appropriately selected depending on the type of the polymerizable compound contained in the composition for forming a surface protective layer. The polymerization initiator may be a thermal polymerization initiator or a photopolymerization initiator, but is preferably a photopolymerization initiator. In particular, a radical polymerization initiator is preferable.

The radical polymerization initiator is not particularly limited and a known radical polymerization initiator can be used, and examples thereof include alkylphenone compounds and phosphine oxide compounds. Among these, a compound having an α-aminoalkylphenone structure or an acylphosphine oxide structure is preferable, and a compound having an acylphosphine oxide structure is more preferable. An example of the compound having an acylphosphineoxide structure includes Omnirad819 (bis (2,4,6-trimethylbenzoyl) phenylphosphineoxide, manufactured by IGM Resins B. V). The polymerization initiators may be used alone or in combination of two or more thereof.

The composition for forming a surface protective layer may contain, in addition, a solvent, inorganic fine particles, lubricating organic fine particles, an antioxidant, a stabilizer, a silicone oil, and the like.

The thickness of the surface protective layer is preferably 0.2 to 10 μm, more preferably 0.5 to 6 μm.

[Method for Producing Photoreceptor] The photoreceptor can be produced by, for example, sequentially forming the layers constituting the photoreceptor on the surface of the support according to the present invention. The formation of each layer is performed by a step of forming a coating film formed of a application liquid containing a solid content (or a raw material component thereof) constituting each layer and a solvent, and a step of curing the coating film. A specific method for producing a photoreceptor will be described below with reference to the method for producing the photoreceptor 1 illustrated in FIG. 1 as an example.

The photoreceptor 1 can be produced, for example, through the following steps.

Step (1): a step of applying an application liquid for forming an intermediate layer to a surface of the support 101 and drying the application liquid to form the intermediate layer 102.

Step (2): a step of forming the charge generating layer 103 by applying a application liquid for forming a charge generating layer to the surface of the intermediate layer 102 and drying the application liquid.

Step (3): This is a step of forming the charge transport layer 104 by applying an application liquid for charge transport layer formation to the surface of the charge generating layer 103, and drying the application liquid.

Step (4): This is a step of applying the surface of the charge transport layer 104 with a application liquid for forming a surface protective layer to form a coating film, and curing the coating film to form the surface protective layer 105.

<Step (1): Formation of Intermediate Layer>

The intermediate layer 102 can be formed by applying a application liquid for forming an intermediate layer to the surface of the conductive support 101 to form a coating film and drying the coating film. The application liquid for forming an intermediate layer can be prepared by dissolving a binder resin for an intermediate layer in a solvent and dispersing conductive particles therein.

As a means for dispersing the conductive particles, an ultrasonic disperser, a ball mill, a sand mill, a homomixer, or the like can be used.

Examples of a method for applying the application liquid for forming an intermediate layer include a dip coating method, a spray coating method, a spinner coating method, and a bead coating method. Examples of the applying method include known methods such as a blade coating method, a beam coating method, and a slide hopper method (including a circular slide hopper method). The circular slide hopper method is a method used for applying an outer peripheral surface of a cylindrical or columnar article as a surface to be coated. The circular slide hopper method can be used as a method for applying the outer peripheral surface of a drum-shaped conductive support with a application liquid for forming an intermediate layer.

The method for drying the coating film can be appropriately selected depending on the type of the solvent and the thickness of the coating film, but heat drying is preferred.

The solvent used in the step of forming the intermediate layer may be any solvent that satisfactorily disperses the conductive particles or the metal oxide particles and dissolves the binder resin for an intermediate layer.

Specifically, the solvent is preferably an alcohol-based solvent having 1 to 4 carbon atoms, such as methanol, ethanol, N-propyl alcohol, isopropyl alcohol, N-butanol, t-butanol, or sec-butanol. By using these solvents, the solubility of the binder resin and the applying performance are excellent.

Furthermore, examples of a co-solvent that can be used in combination with the above-described solvent in order to improve the storage stability and the dispersibility of particles include benzyl alcohol, toluene, methylene chloride, cyclohexanone, and tetrahydrofuran.

The concentration of the binder resin for an intermediate layer in the application liquid for forming an intermediate layer is appropriately selected according to the thickness of the intermediate layer and the production rate.

<Step (2): Formation of Charge Generating Layer>

The charge generating layer 103 can be formed by applying a application liquid for forming a charge generating layer onto the surface of the intermediate layer 102 to form a coating film, and drying the coating film. The application liquid for forming the charge generating layer can be prepared by dispersing the charge generating compound in a solution prepared by dissolving the binder resin for a charge generating layer in a solvent.

As a means for dispersing the charge generating compound in the application liquid for forming the charge generating layer, for example, an ultrasonic disperser, a ball mill, a sand mill, or a homomixer can be used.

Examples of a method for applying the application liquid for forming the charge generating layer include a dip coating method, a spray coating method, a spinner coating method, and a bead coating method. Examples of the applying method include known methods such as a blade coating method, a beam coating method, and a slide hopper method (including a circular slide hopper method).

The method for drying the coating film can be appropriately selected depending on the type of the solvent and the thickness of the coating film, but heat drying is preferred.

Examples of solvents used for forming the charge generating layer include toluene, xylene, methylenechloride, 1,2-dichloroethane, methylethylketone, and cyclohexane. Examples of the solvent include ethyl acetate, t-butyl acetate, methanol, ethanol, propanol, butanol, and methyl cellosolve. Examples of the solvent include 4-methoxy-4-methyl-2-pentanone, ethyl cellosolve, tetrahydrofuran, 1-dioxane, 1,3-dioxolane, pyridine, and diethylamine.

<Step (3): Formation of Charge Transport Layer>

The charge transport layer 104 can be formed by applying an application liquid for forming a charge transport layer to the surface of the charge generating layer 103 to form a coating film, and drying the coating film. The application liquid for forming the charge transport layer can be prepared by dissolving a binder resin for a charge transport layer and a charge transporting compound in a solvent.

Examples of a method for applying the application liquid for forming the charge transport layer include a dip coating method, a spray coating method, a spinner coating method, and a bead coating method. Examples of the applying method include known methods such as a blade coating method, a beam coating method, and a slide hopper method (including a circular slide hopper method).

The method for drying the coating film can be appropriately selected depending on the type of the solvent and the thickness of the coating film, but heat drying is preferred.

Examples of solvents that can be used to form the charge transport layer 104 include toluene, xylene, methylenechloride, 1,2-dichloroethane, methylethylketone, and cyclohexanon. Examples of the solvents include ethylacetate, butylacetate, methanol, ethanol, propanol, butanol, tetrahydrofuran, 1,4-dioxane, 1,3-dioxolane, pyridine, and diethylamine.

<Step (4): Formation of Surface Protective Layer>

The surface protective layer 105 can be formed by applying a application liquid for forming a surface protective layer onto the surface of the charge transport layer 104 to form a coating film, and curing the coating film.

The application liquid for forming the surface protective layer can be typically prepared by dissolving or dispersing a composition for forming the surface protective layer in a solvent. However, when the composition for forming a surface protective layer is a liquid composition having a viscosity such that the composition can be applied to the surface of the charge transport layer, it is not necessary to use a solvent. In this case, the composition for forming a surface protective layer itself can be used as the application liquid for forming a surface protective layer.

Examples of solvents used for forming the surface protective layer include methanol; ethanol; N-propyl alcohol; isopropyl alcohol; N-butanol; t-butanol and sec-butanol. Furthermore, examples of the solvent include benzyl alcohol, toluene, xylene, dichloromethane, methyl ethyl ketone, cyclohexane, ethyl acetate, and butyl acetate. Examples of the solvents include methyl cellosolve, ethyl cellosolve, tetrahydrofuran, 1,4-dioxane, 1,3-dioxolane, pyridine, and diethylamine.

Examples of a method of applying the application liquid for forming the surface protective layer include a slide hopper method (including a circular slide hopper method), a dip coating method, and a spray coating method. Examples of the applying method include known methods such as a spinner coating method, a bead coating method, a blade coating method, and a beam coating method.

After the applying of the application liquid for forming a surface protective layer, the surface protective layer 105 can be formed by curing the coating film through reaction of the reaction components in the coating film.)

The coating film may be subjected to the curing treatment without drying, but is preferably subjected to the curing treatment after natural drying or heat drying.

The drying conditions can be appropriately selected depending on the type of the solvent, the thickness of the coating film, and the like. The drying temperature is preferably in the range from room temperature (25° C.) to 180° C. particularly preferably in the range from 80 to 140° C. The drying time is preferably 1 to 200 minutes, and particularly preferably 5 to 100 minutes.

In the curing treatment for curing the coating film, for example, the coating film is irradiated with ultraviolet rays to generate radicals, and the polymerizable compound is subjected to a polymerization reaction.

As the ultraviolet light source, any light source can be used without limitation as long as it generates ultraviolet rays. As the light sources, for example, low-pressure mercury lamp; medium pressure mercury lamp; high-pressure mercury lamp; ultrahigh pressure mercury lamp; carbon arc lamp; metal halide lamp; xenon lamp, flash (pulse) xenon lamp, and the like can be used.

Although the irradiation conditions differ depending on each lamp, for example, the irradiation amount of ultraviolet rays is usually within the range of 5 to 500 mJ/cm$^2$, preferably within the range of 5 to 100 mJ/cm$^2$. The power of the lamp is preferably within the range of 0.1 to 5 kW, particularly preferably in the range of 0.5 to 3 kW. An irradiation time for obtaining a necessary irradiation amount of ultraviolet rays is, for example, preferably 0.1 seconds to 10 minutes, and from the viewpoint of working efficiency, 0.1 seconds to 5 minutes is more preferable.

In the step of forming the surface protective layer, drying can be appropriately performed before, after, and during the irradiation with ultraviolet rays.

[Image Forming System] The "image forming system" of the present invention refers to an assembly which is constituted by devices or apparatuses having predetermined functions as means and elements necessary for each step of image formation, an electrostatic charge image developing toner, and the like, and which performs the function of image formation as a whole. It is to be noted that the respective means and elements may be individually disposed at different places apart from each other, or may be collectively disposed in a certain space as one device to be integrally formed as a system device.

The present invention features a the image forming system includes a photoreceptor having a photosensitive layer formed on a support containing aluminum as a main component, a developer that develops a latent image formed on the photoreceptor with an electrostatic charge image developing toner, a transferer that transfers a toner image on the photoreceptor onto a transfer target, a cleaner for removing the electrostatic charge image developing toner remaining on the photoreceptor after the transfer by rubbing, and the electrostatic charge image developing toner. The support contains silicon in the range of more than 0.6% by mass and 12.6% by mass or less, a shape factor of toner particles included in the electrostatic charge image developing toner is in a range of 0.800 to 0.970, and a content of the toner particles having a particle diameter of 2 µm or less is in a range of 5 to 30% by number.

The image forming system of the present invention is a system for forming an image using the photoreceptor, the developer, the transferer, the cleaner, and the electrostatic charge image developing toner. Hereinafter, for the convenience of description, an apparatus section including a photoreceptor, a developer, a transferer and a cleaner is particularly referred to as an "electrophotographic image forming apparatus". As long as the image forming system of the present invention is a system of a form or mode in which an image is formed using a photoreceptor formed on a support containing aluminum having a silicon content within the specific range as a main component, a developer, a transferer, and a cleaner, and a charge image developing toner satisfying the conditions of the specific shape factor and particle diameter of the toner particles, each unit constituting the electrophotographic image forming apparatus is not limited. That is, the apparatus used in the present invention is not particularly limited as long as it is an apparatus satisfying the above conditions, and it is not always necessary to use an electrophotographic image forming apparatus dedicated to the toner for developing a charge image satisfying the above specific conditions according to the present invention.

Further, the image forming system of the present invention is also preferably provided with a means for recording and storing the recording and copying information as electronic data and a means for wirelessly communicating the electronic data. For example, a wireless interface for transmitting and receiving data to and from the information processing device by wireless communication such as Bluetooth® or Wi-Fi® is preferably provided.

A typical electrophotographic image forming apparatus that can be used in the present invention is described below. The electrophotographic image forming apparatus is also simply referred to as an "image forming apparatus".

The image forming apparatus includes the photoreceptor, a developer, a transferer, and a cleaner. The image forming apparatus preferably includes a charging unit (first charging unit) and an exposure unit. Furthermore, the image forming apparatus may include a second charging means between the transferer and the cleaner.

Figure 2:
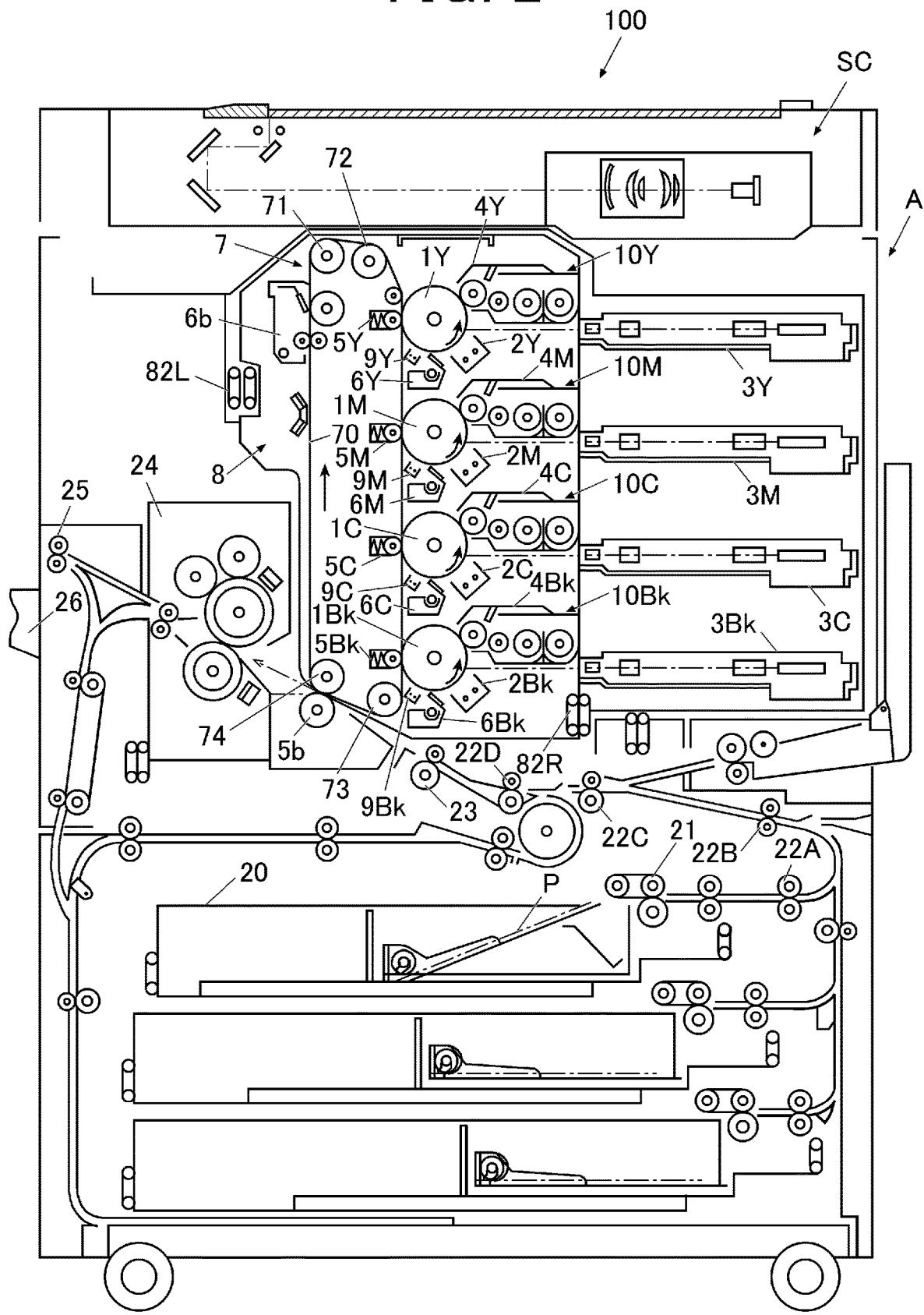
FIG. 2 is a schematic cross-sectional view illustrating an example of the image forming apparatus.

FIG. 2 is a schematic configurational view illustrating an example of an image forming apparatus according to the present invention. The image forming apparatus 100 is referred to as a tandem-type color image forming apparatus. The image forming apparatus 100 includes four process cartridges 10Y, 10M, 10C, and 10Bk, an intermediate transfer body unit 7, a sheet feed means 21, a fixing means 24, and the like. At an upper part of an apparatus main body A of the image forming apparatus 100, a document image reading device SC is arranged.

The process cartridge 10Y that forms a yellow image includes, around a drum-shaped photoreceptor 1Y, a first charging means 2Y, an exposure means 3Y, a developer 4Y, a primary transfer roller 5Y, a second charging means 9Y, and a cleaner 6Y which are sequentially arranged along a direction of rotation of the photoreceptor 1Y.

The process cartridge 10M for forming a magenta image includes a first charging unit 2M, an exposure unit 3M, a developer 4M, a primary transfer roller 5M, a second charging unit 9M, and a cleaner 6M, which are sequentially arranged around a drum-shaped photoreceptor 1M along the rotation direction of the photoreceptor, 1M.

The process cartridge 10C that forms a cyan image includes, around a drum-shaped photoreceptor 1C, a first charging means 2C, an exposure means 3C, a developer 4C, a primary transfer roller 5C, a second charging means 9C, and a cleaner 6C, which are sequentially arranged along a direction of rotation of the photoreceptor 1C.

The process cartridge 10Bk that forms a black image includes, around a drum-shaped photoreceptor 1Bk, a first charging means 2Bk, an exposure means 3Bk, a developer 4Bk, a primary transfer roller 5Bk, a second charging means 59Bk, and a cleaner 6Bk, which are sequentially arranged along a rotation direction of the photoreceptor 1Bk.

As the photoreceptors 1Y, 1M, 1C, and 1Bk, the above-described electrophotographic photoreceptor of the present invention is used.

The process cartridges 10Y, 10M, 10C, and 10Bk are configured in the same manner except that the colors of the toner images formed on the photoreceptors 1Y, 1M, 1C, and 1Bk are different. Therefore, the process cartridge 10Y will be described in detail as an example, and the description of the process cartridges 10M, 10C and 10Bk will be omitted.

The process cartridge 10Y includes, around a photoreceptor 1Y serving as an image forming member, a first charging means 2Y, an exposure means 3Y, a developer 4Y, a primary transfer roller 5Y, a second charging means 9Y, and a cleaner 6Y, The process cartridge 10Y forms a yellow (Y) toner image on the photoreceptor 1Y. The process cartridge 10Y may be detachable from the image forming apparatus 100. Furthermore, in the present embodiment, of the process cartridges 10Y, at least the photoreceptor 1Y, the first charging means 2Y, the developer 4Y, the second charging means 9Y, and the cleaner 6Y are provided integrally.

The first charging means 2Y is a means for providing a uniform potential to the photoreceptor 1Y, and for example, a corona discharge-type charging device is used.

The exposure means 3Y is a means for performing exposure, based on the image signal (yellow), on the photoreceptor 1Y to which the uniform potential has been applied by the first charging means 2Y, to form an electrostatic latent image corresponding to a yellow image. As the exposure means 3Y, for example, one composed of an LED in which light emitting elements are arranged in an array form in the axial direction of the photoreceptor 1Y and image forming elements, or a laser optical system is used.

The developer 4Y includes, for example, a developing sleeve which contains a magnet, holds a developer, and rotates, and a voltage application device which applies a DC and/or AC bias voltage between the 1Y of the photoreceptor and the developing sleeve.

The primary transfer roller 5Y is a means that transfers the toner image formed on the photoreceptor 1Y to an intermediate transfer body 70 in the form of an endless belt. The primary transfer roller 5Y is disposed in contact with the intermediate transfer body 70.

The second charging unit 9Y is a discharging unit that charges (discharges) the surfaces of the photoreceptors 1Y after the toner images are transferred to the intermediate transfer body 70, and is provided as a pre-cleaning member. As the second charging means 9Y, for example, a corona discharge type charging device is used.

The cleaner 6Y is composed of a cleaning blade and a brush roller provided on the upstream side from the cleaning blade.

The intermediate transfer body unit 7 includes an endless belt-shaped intermediate transfer body 70. The intermediate transfer body 70 is a second image bearing member in the form of a semiconductive endless belt wound around and rotatably supported by a plurality of rollers 71, 72, 73 and 74.

The intermediate transfer body unit 7 is provided with a cleaner 6b for removing the toner on the intermediate transfer body 70.

Furthermore, the process cartridges 10Y, 10M, 10C, and 10Bk and the intermediate transfer body unit 7 constitute a housing 8. The housing 8 is configured to be drawable from the apparatus main body A via the support rails 82L and 82R.

The image forming apparatus 100 includes a secondary transfer roller 5b that transfers the color image formed on the intermediate transfer body 70 to the transfer material P. The sheet feed section 21 is a means for supplying the transfer material P to the secondary transfer roller 5b. The sheet feed section 21 includes a sheet feed cassette 20 that stores the transfer material P, and a plurality of intermediate rollers 22A, 22B, 22C, 22D, and registration rollers 23 for conveying the transfer material P to the secondary transfer roller 5b.

The fixing means 24 is a means for fixing the color image transferred to the transfer material P to the transfer material P. An example of the fixing means 24 includes a heat roller fixing method. Such fixing means 24 is composed of, for example, a heating roller internally provided with a heat source and a pressure roller provided in a state of being pressed against the heating roller so as to form a fixing nip part. The image forming apparatus 100 has a sheet ejection tray 26 for taking out the transfer material P on which the image has been formed. Furthermore, the image forming apparatus 100 includes, on the downstream of the fixing section 24, sheet ejection rollers 25 that convey the fixed transfer material P to a sheet ejection tray 26.

Note that the image forming apparatus 100 is a color laser printer in the embodiment described above, but is not limited to this. For example, the image forming apparatus may be a monochrome laser printer, a copier, a multifunction peripheral, or the like. Furthermore, the exposure light source may be a light source other than a laser, for example, an LED light source.

Using the above-described image forming apparatus, an image can be formed as follows.

In the charging step (first charging step), the surfaces of the photoreceptors 1Y, 1M, 1C, and 1Bk are negatively charged by being discharged by the first charging units 2Y, 2M, 2C, and 2Bk.

In the exposure step, the surfaces of the photoreceptors 1Y, 1M, 1C, and 1Bk are exposed to light based on image signals by exposure means 3Y, 3M, 3C, and 3Bk to form electrostatic latent images.

In the developing step, the developers 4Y, 4M, 4C, and 4Bk apply toners to the surfaces of the photoreceptors 1Y, 1M, 1C, and 1Bk to develop the surfaces, thereby forming toner images.

In the transfer step, the primary transfer rollers 5Y, 5M, 5C, and 5Bk sequentially transfer (primarily transfer) the toner images in the respective colors formed on the photoreceptors 1Y, 1M, 1C, and 1Bk onto the rotating intermediate transfer body 70. Then, a color image is formed on the intermediate transfer body 70.

In the second charging step, the surfaces of the photoreceptors 1Y, 1M, 1C, and 1Bk are neutralized by the second charging means 9Y, 9M, 9C, and 9Bk.

In the cleaning step, toner remaining on the surfaces of the photoreceptors 1Y, 1M, 1C, and 1Bk is removed by cleaner 6Y, 6M, 6C, and 6Bk. Then, in preparation for the next image forming process, the photoreceptors 1Y, 1M, 1C, and 1Bk are negatively charged by the charging units 2Y, 2M, 2C, and 2Bk.

On the other hand, a transfer material P is fed from a sheet feed cassette 20 by sheet feed means 21 and is conveyed to the secondary transfer roller 5b via a plurality of intermediate rollers 22A, 22B, 22C, 22D and registration rollers 23. Then, the color image is transferred (secondarily transferred) onto a transfer material P by a secondary transfer roller 5b.

The transfer material P on which the color image has been transferred in this way is subjected to fixing processing by fixing means 24, then sandwiched between sheet ejection rollers 25, ejected to the outside of the apparatus, and placed on a sheet ejection tray 26. After the transfer material P is separated from the intermediate transfer body 70, the residual toner on the intermediate transfer body 70 is removed by a cleaner 6b.

As described above, an image can be formed on the transfer material P.

<Toner>

Next, the toner used in the image forming system of the present invention will be described.

As described above, the toner according to the present invention has a shape factor of the toner particles in the range of 0.800 to 0.970, and preferably in the range of 0.930 to 0.970.

Furthermore, in the toner according to the present invention, the content of the toner particles having a particle diameter of 2 μm or less (fine powder content) is in the range of 5 to 30% by number.

Methods for measuring the shape factor and the fine powder content of the toner particles are as described above.

A toner according to the present invention includes toner particles each including a toner base particle and an external additive externally added to the toner base particle.

The toner particles preferably contain strontium titanate because the toner particles can effectively exert an abrasive force.

The strontium titanate is preferably externally added to toner base particles as an external additive.

<Toner Base Particles>

The toner base particles contain a binding resin.

(Binding Resin)

The binding resin is a resin having a function of binding toner particles to a recording medium.

Examples of the binding resin to be used in the toner base particles include the following, Polystyrene; homopolymers of styrene substitution products such as poly-p-chlorostyrene and polyvinyltoluene; styrene-based copolymers such as styrene-p-chlorostyrene copolymers, styrene-vinyltoluene copolymers, styrene-vinylnaphthalene copolymers, styrene-acrylic ester copolymers, styrene-methacrylic ester copolymers, styrene-α-methyl chloromethacry late copolymers, styrene-acrylonitrile copolymers, styrene-vinyl methyl ether copolymers, styrene-vinyl ethyl ether copolymers, styrene-vinyl methyl ketone copolymers, styrene-butadiene copolymers, styrene-isoprene copolymers, and styrene-acrylonitrile-indene copolymers; polyvinyl chloride, phenol resins, natural modified phenol resins, natural resin-modified maleic acid resins, acrylic resins, methacrylic resins, polyvinyl acetate, silicone resins, polyester resins, polyurethanes, polyamide resins, furan resins, epoxy resins, xylene resins, polyvinyl butyral, terpene resins, coumarone-indene resins, and petroleum-based resins.

Preferable examples of the binding resin include a styrene-based copolymer and a polyester resin. These resins may be used alone or in combination of two or more kinds thereof.

(Release Agent)

The release agent is a component that exudes from toner particles during development and enhances fixing releasability and the like.

Examples of the release agent include the following. Low molecular weight polyolefins such as polyethylene; silicones having a melting point; fatty acid amides such as oleic acid amide, erucic acid amide, ricinoleic acid amide and stearic acid amide; ester waxes such as stearyl stearate; vegetable waxes such as carnauba wax, rice wax, candelilla wax, Japan wax and jojoba oil; animal waxes such as beeswax; mineral and petroleum waxes such as montan wax, ozokerite, ceresin, paraffin wax, microcrystalline wax, Fischer-Tropsch wax and ester wax; and modified products thereof.

The release agents may be used alone or in combination of two or more thereof.

The melting point of the release agent is preferably 150° C. or lower, more preferably 40° C. or higher and 130° C. or lower, and even more preferably 40° C. or higher and 110° C. or lower. The content of the release agent is preferably 1 part by mass or more and 30 parts by mass or less relative to 100 parts by mass of the binding resin.

(Other Components)

The toner particles may contain a colorant, a charge control agent, and the like, if necessary.

Examples of the colorant include carbon black, a magnetic substance, a pigment, and a dye. The coloring agent may be used alone or in combination of two or more kinds thereof.

Examples of the carbon black include channel black, furnace black, acetylene black, thermal black, and lamp black.

Examples of the magnetic substance include ferromagnetic metals such as iron, nickel, and cobalt, alloys containing these metals, and compounds of ferromagnetic metals such as ferrite and magnetite.

Examples of the pigment include the following. C. I. Pigment Red 2, 3, 5, 7, 15, 16, 48:1, 48:3, 53:1, 57:1, 81:4, 122, 123, 139, 144, 149, 166, 177, 178, 208, 209, 222, 238, 269, C. I. Pigment Oranges 31, 43, and C. I. Pigment Yellow 3, 9, 14, 17, 35, 36, 65, 74, 83, 93, 94, 98, 110, 111, 138, 139, 153, 155, 180, 181, 185, C. I. Pigment Green 7, C. I. Pigment Blue 15:3, 15:4, and 60, and phthalocyanine pigments in which the central metal is zinc, titanium, magnesium, or the like.

Examples of such dyes include the following: C. I. Solvent Red 1, 3, 14, 17, 18, 22, 23, 49, 51, 52, 58, 63, 87, 111, 122, 127, 128, 131, 145, 146, 149, 150, 151, 152, 153, 154, 155, 156, 157, 158, 176, 179, pyrazolotriazole azo dyes, pyrazolotriazole azomethine dyes, pyrazolone azo dyes, pyrazolone azomethine dyes, and C. I. Solvent Yellow 19, 44, 77, 79, 81, 82, 93, 98, 103, 104, 112, 162, and C. I. Solvent Blue 25, 36, 60, 70, 93, 95 and the like.

The amount of the colorant is preferably 1 to 30 parts by mass, and more preferably 2 to 20 parts by mass with respect to 100 parts by mass of the total amount of the toner particles.

Examples of the charge control agent include nigrosine dyes, metal salts of naphthenic acid or higher fatty acids, alkoxylated amines, quaternary ammonium salt compounds, azo metal complexes, and metal salts of salicylic acid or metal complexes thereof.

The amount of the charge control material is 0.1 to 5.0 parts by mass relative to 100 parts by mass of a total amount of the binding resin.

(External Additive)

The external additive functions to control the fluidity, chargeability; and the like of the toner particles. The toner particles according to the present invention preferably contain strontium titanate as an external additive in that the polishing force can be effectively exhibited.

In addition, the toner particles may include only one type of external additive, or may include two or more types thereof.

Examples of the external additive other than strontium titanate include silica particles, titania particles, alumina particles, zirconia particles, zinc oxide particles, chromium oxide particles, and cerium oxide particles.

Examples of the external additive include antimony oxide particles, tungsten oxide particles, tin oxide particles, tellurium oxide particles, manganese oxide particles, and boron oxide particles.

The surface of the external additive is preferably subjected to hydrophobic treatment. A known surface treatment agent is used for the hydrophobic treatment. The surface treatment agent may be used alone or in combination of two or more kinds thereof. Examples of the surface treatment agent include a silane coupling agent, silicone oil, a titanate-based coupling agent, an aluminate-based coupling agent, a fatty acid, a fatty acid metal salt, an esterified product thereof, and rosin acid.

Examples of the silane coupling agent include dimethyldimethoxysilane, hexamethyldisilazane (HMDS), methyltrimethoxysilane, isobutyltrimethoxysilane, and decyltrimethoxysilane, Examples of the silicone oil include cyclic compounds and linear or branched organosiloxanes. More specifically, organosiloxane oligomers, octamethylcyclotetrasiloxane, decamethylcyclopentasiloxane, tetramethylcyclotetrasiloxane, tetravinyltetramethylcyclotetrasiloxane, and the like are included.

Examples of the silicone oil include highly reactive silicone oil at least the end of which is modified by introducing a modifying group into a side chain, one end, both ends, one end of a side chain, both ends of a side chain, or the like. The type of the modifying group may be one or more. Examples of the modifying group include alkoxy, carboxyl, carbinol, higher fatty acid modification, phenol, epoxy, (meth) acryloyl, and amino.

The content of the external additive is preferably from 0.1 to 10.0% by mass relative to the total amount of the toner particles, more preferably from 1.0 to 3.0% by mass.

(Particle Diameter of Toner Particles)

The size of the toner particles is not particularly limited as long as the effect and the purpose of the present invention are not impaired. Usually, the volume average particle diameter (volume-based median diameter) of the toner particles is preferably in the range of 3.0 to 8.0 μm.

As for the volume-average particle diameter of the toner particles, the measurement and calculation are performed using an apparatus connected to a computer system (manufactured by Beckman Coulter, Inc) equipped with "Coulter Counter Multisizer 3" (manufactured by Beckman Coulter, Inc) using data-processing software "Software V3. 51".

As a measurement procedure, toner 0.02 g is mixed with the surfactant liquid 20 ml, and then ultrasonic dispersion is performed for 1 minute to prepare a toner dispersion liquid.

The surfactant solution is, for example, a surfactant solution obtained by diluting a neutral detergent containing a surfactant component with pure water by 10 times for the purpose of dispersing the toner.

The prepared toner dispersion was mixed with ISOTON II (Beckman Coulter, Inc) in a sample stand with pipette until the concentration indicated by the measuring instrument reaches 5% to 10%. Within this concentration range, a reproducible measurement value can be obtained. In the measuring machine, the number of counted particles to be measured is set to 25000, and the aperture diameter is set to 100 μm. Then, the frequency value is calculated by dividing the range of 2.0 to 60 μm which is the measurement range into 256, and the particle diameter of 50% from the larger volume integrated fraction is set as the volume-based median diameter (volume $D_{50}$% diameter).

The volume average particle diameter of the toner particles can be adjusted by, for example, conditions of temperature and stirring in production of the toner particles, classification of the toner particles, and mixing of classified products of the toner particles.

[Method for Producing Toner] The method for producing the toner according to the present invention is not particularly limited, and known methods such as an emulsion aggregation method, a pulverization method, and a suspension polymerization method can be used.

The method for producing the toner according to the present invention preferably uses a pulverization method.

Specifically, the method for producing a toner includes the steps of melt-kneading a mixture containing a binding resin and a colorant, and if necessary, other components such as a release agent to obtain a melt-kneaded product, and pulverizing the melt-kneaded product to obtain toner particles.

A procedure for producing a toner including pulverized toner particles using a pulverization method is described below as an example.

First, as materials constituting toner particles, for example, a binding resin and a colorant, and if necessary, other components such as a release agent and a charge control agent are weighed in predetermined amounts, blended, and mixed.

Examples of the mixing apparatus include a double-cone mixer, a V-type mixer, a drum-type mixer, a super mixer, a Henschel mixer, a Nauta mixer, and a mechanohybrid.

Next, the mixed material is melted and kneaded.

In the melt-kneading step, a batch-type kneader such as a pressure kneader or a Banbury mixer, or a continuous-type kneader can be used. A single-screw or double-screw extruder is preferred because of its superiority in continuous production.

The melt-kneading temperature is preferably about 100 to 200° C.

Examples of the twin-screw extruder include a KTK twin-screw extruder (manufactured by Kobe Steel, Ltd), a TEM twin-screw extruder (manufactured by Toshiba Machine Co., Ltd), and a PCM kneader (manufactured by Ikegai Ironworks Co., Ltd). Furthermore, examples of the twin-screw extruder include a twin-screw extruder (manufactured by K. C. Ke. Co., Ltd), a co-kneader (manufactured by Buss AG), and KNEADEX (manufactured by Nippon Coke & Engineering Co., Ltd). Further, the resin composition obtained by melt-kneading is rolled with a two roll or the like, and rapidly cooled with water or the like in a cooling step.

Next, the cooled product of the resin composition is pulverized to a desired particle diameter in a pulverization step.

In the pulverization step, for example, the pulverized product is coarsely pulverized with a pulverizer such as a crusher, a hammer mill, or a feather mill, and then further finely pulverized with a fine pulverizer. Examples of the fine pulverizer include Kryptron System (manufactured by Kawasaki Heavy Industries, Ltd). Super Rotor (manufactured by Nisshin Engineering Inc), Turbo Mill (manufactured by Turbo Kogyo Co., Ltd), and air-jet type fine pulverizers.

Thereafter, if necessary, the resultant is classified using a classifier or a sieving machine, and pulverized toner particles are obtained as a classified product.

Examples of the classifier include Elbow Jet (manufactured by Nittetsu Mining Co., Ltd) of an inertial classification system, Turboplex (manufactured by Hosokawa Micron Corporation) of a centrifugal force classification system, TSP Separator (manufactured by Hosokawa Micron Corporation), and Faculty (manufactured by Hosokawa Micron Corporation).

[Developer] The toner according to the present invention can be suitably used as the following developer. For example, the toner may be used as a one component magnetic toner by incorporating a magnetic substance, may be used as a two component developer by mixing with a so-called carrier, or may be used as a nonmagnetic toner alone. The toner according to the present invention can be suitably used in any of the above-described cases.

As the magnetic substance, for example, magnetic tight, γ-hemattight, various kinds of ferrite, or the like can be used.

As the carrier constituting the two component developer, magnetic particles made of a conventionally known material such as a metal such as iron, steel, nickel, cobalt, ferrite, or magnetic, or an alloy of such a metal and a metal such as aluminum or lead can be used.

As the carrier, it is preferable to use a coated carrier obtained by coating the surface of magnetic particles with a coating agent such as a resin, or a so-called resin dispersion type carrier obtained by dispersing a magnetic powder in a binder resin.

The resin for coating is not particularly limited, but for example, an olefin resin, a styrene resin, a styrene-acrylic resin, a silicone resin, a polyester resin, or a fluororesin is used.

The resin for forming the resin-dispersed carrier is not particularly limited, and a known resin can be used. As such a resin, for example, an acrylic resin, a styrene-acrylic resin, a polyester resin, a fluororesin, a phenol resin, or the like can be used.

The volume-based median diameter of the carrier is preferably in a range of 20 to 100 μm, and more preferably in a range of 25 to 60 μm.

The volume-based median diameter of the carrier can be measured typically by a laser diffraction-type particle size distribution measuring apparatus equipped with a wet disperser. Examples of the laser diffraction particle size distribution analyzer include "HELOS" (manufactured by SYMPATEC GmbH).

The amount of the toner mixed with the carrier is preferably in the range of 2 to 10% by mass relative to 100% by mass of the total mass of the toner and the carrier.

EXAMPLES

Hereinafter, the present invention will be specifically described with reference to Examples, but the present invention is not limited thereto. Note that in the following Examples, operations were performed at room temperature (25° C.) unless otherwise specified. Further, unless otherwise specified, "%" and "part (s)" mean "% by mass" and "part (s) by mass", respectively.

<Preparation of Photoreceptor 1>

(1) Preparation of Photoreceptor Support

A support 1 (outer diameter φ30 mm, length 360 mm) made of an aluminum-based allay having a composition described in the following Table I was prepared.

(2) Formation of Intermediate Layer

The following materials were mixed and dispersed to prepare a application liquid for an intermediate layer. At this time, a sand mill was used as a dispersing machine, and the dispersion was performed batchwise for 10 hours.

| polyamide resin | 1.0 parts by mass |
| titanium oxide | 1.1 part by mass |
| ethanol | 20 parts by mass |

As the polyamide resins (resinous binders), X1010 (manufactured by Daicel-Evonik Ltd) was used. As the titanium oxide (conductive particles), SMT500SAS (manufactured by Tayca Corporation) was used. The number average primary particle diameter of the titanium oxide is 0.035 μm.

The application liquid for an intermediate layer was applied to the surface of the support by a dip coating method. Next, this was dried in an oven at 110° C. for 20 minutes. Thus, a 3-μm-thick intermediate layer was formed.

(3) Formation of Charge Generating Layer

The following materials were mixed and dispersed with a circulation type ultrasonic homogeniser "RUS-600TCVP (manufactured by NIHONSEIKI KAISHA LTD.)" to prepare a application liquid for a charge generating layer. The dispersion conditions were 19.5 kHz, 600 W, a circulating flow rate of 40 L/H, and 0.5 hours.

| Charge generating compound | 24 parts by mass |
| polyvinyl butyral resin | 12 parts by mass |
| mixed solvent | 400 parts by mass |

As the charge generating compound, there used a mixed crystal of non-added titanyl phthalocyanine and a 1:1 addition product of (2R,3R)-2,3-butanediol and titanyl phthalocyanine having clear peaks at 8.3°, 24.7°, 25.1°, and 26.5° at Cu-Kα characteristic X-ray diffraction spectrum measurement. As the polyvinyl butyral resin, S-LEC BL-1 (manufactured by Sekisui Chemical Co., Ltd., "S-LEC" is a registered trademark of the company) was used. As the mixed solvents, 3-methyl-2-butanone:cyclohexane=4:1 (volumetric ratio) was used.

The application liquid for a charge generating layer was applied to the surface of the intermediate layer by a dip coating method and dried. Thus, charge generating layer having the thickness of 0.3 μm was formed.

(4) Formation of Charge Transport Layer

The following materials were mixed and dissolved to prepare a application liquid for a charge transport layer.

| Charge transporting compound (CTM-48) | 75 parts by mass |
| polycarbonate resin | 100 parts by mass |
| antioxidant | 4 parts by mass |

The polycarbonate resins used were Z300 (bisphenol Z polycarbonate manufactured by Mitsubishi Gas Chemical Company. Inc). As the anti-oxidant, IRGANOX1010 (manufactured by BASF, "IRGANOX" is a registered trade mark of the company) was used.

The application liquid for a charge transport layer was applied to the surface of the charge generating layer by dip coating. Next, this was dried at 120° C. for 70 minutes. Thus, a 24 µm-thick charge transport layer was formed.

<Preparation of Photoreceptors 2 to 11>

Photoreceptors 2 to 11 were produced in the same manner as in the production of the photoreceptor 1, except that the support used was changed to each of the supports 2 to 11 listed in the following Table I.

<Preparation of Toner Base Particle 1>

(1) Preparation of Polyester Resin

| | |
|---|---|
| Fumarate | 54.3 parts by mass |
| propylene oxide adduct of bisphenol A (BPA-PO) | 22.0 parts by mass |
| dipropanol | 23.8 parts by mass |
| 2-tin ethylhexanoate (esterification catalysts) | 0.5 parts by mass |

The above-described materials were weighed in a reaction tank equipped with a cooling tube, a stirrer, a nitrogen introduction tube, and a thermocouple. After replacing the inside of the reaction tank with nitrogen gas, the temperature was gradually raised while stirring, and the mixture was reacted for 3 hours while stirring at a temperature of 140° C.

Next, the pressure in the reaction tank was lowered to the 8.3 kPa, the temperature was raised to 200° C. while stirring, and the mixture was reacted for 4 hours (reacting step 1).

Thereafter, the pressure in the reactor was reduced again to 5 kPa or lower, and the mixture was reacted at 200° C. for 3 hours, to obtain a binding resin Al (reacting step 2).

(2) Preparation of Toner Base Particle 1

| | |
|---|---|
| polyester resin | 100.0 parts by mass |
| hydrocarbon wax (Fischer -Tropsch wax) | 5.0 parts by mass |
| C.I. Pigment Blue 15:3 | 6.0 parts by mass |

The above materials were mixed using a Henschel mixer (FM-75 type, manufactured by Mitsui Mining Co., Ltd) at a rotational speed of 20 $s^{-1}$ and a rotational time of 5 min (minutes). Thereafter, the mixture was kneaded with a twin-screw kneader (PCM-30 type, manufactured by Ikegai Corporation) set at a temperature of 150° C.

The obtained kneaded product was cooled and coarsely pulverized to 1 mm or less by a hammermill to obtain a coarsely pulverized product (coarse pulverization step). The obtained coarsely pulverized product was finely pulverized with a mechanical pulverizer (T-250, manufactured by Turbo Kogyo Co., Ltd) (fine pulverization step). Furthermore, classification was performed using a zigzag classifier (a classification step).

The classified particles were subjected to heat treatment with a surface treatment apparatus. Toner base particles 1 were obtained by performing the heat treatment with the temperature of the heat treatment chamber set to 150° C. and the treatment time set to 30 seconds.

<Preparation of Toner Base Particle 2>

In the preparation of the toner base particles 1, a jet mill was used as a pulverizing apparatus, and the air flow temperature was controlled. Toner base particles 2 were produced also in the same manner as the toner base particles 1 except that the heat treatment step with the surface treatment apparatus was not performed.

<Preparation of Toner Base Particles 3>

Toner base particles 3 were obtained in the same manner as the production of the toner base particles 1 except that the temperature of an airflow to be supplied was adjusted in the step of performing fine pulverization with the mechanical pulverizer (fine pulverization step).

<Preparation of Toner Base Particles 4>

Toner base particles 4 were produced in the same manner as the production of the toner base particles 1 except that the temperature of an airflow to be supplied was adjusted in the step of performing fine pulverization with the mechanical pulverizer.

<Preparation of Toner Base Particle 5>

Toner base particles 5 were obtained as in the case of the toner base particles 1, except that the high-speed rotor classifier "turbo classifier" was used in the classification step in the production of the toner base particles 1.

<Preparation of Toner Base Particles 6>

Toner base particles 6 were produced in the same manner as the production of the toner base particles 3 except that the classification step was not performed.

<Preparation of Toner Base Particles 7>

In the preparation of the toner base particles 1, a jet mill was used as a pulverizing apparatus, and the air flow temperature was controlled. Toner base particles 7 were also obtained as with the toner base particles 1 except that the heat treatment step using the surface treatment apparatus was not performed.

<Preparation of Toner Base Particle 8>

In the preparation of the toner base particles 1, a jet mill was used as a pulverizing apparatus, and the air flow temperature was controlled. Toner base particles 8 were also obtained as with the toner base particles 1 except that the heat treatment step using the surface treatment apparatus was not performed.

<Preparation of Toner Base Particles 9>

Toner base particles 9 were produced in the same manner as in the production of the toner base particles 1, except that the particles finely pulverized by the mechanical pulverizer were treated by a spheroidization treatment apparatus (ANGMILL: manufactured by Hosokawa Micron Corporation).

<Production of Toner Base Particle 10>

Toner base particles 10 were obtained in the same manner as in the production of the toner base particles 1 except that the high-speed rotor classifier "turbo classifier" was used in the classification step.

<Preparation of Toner Base Particle 11>

Toner base particles 11 were produced in the same manner as the production of the toner base particles 1 except that the classification step and the heat treatment step were not performed.

<Preparation of Toner 1>

| | |
|---|---|
| Toner base particles 1 | 100 parts by mass |
| Hydrophobic silica fine particles hydrophobized with hexamethyldisilazane (BET: 200 $m^2/g$) | 1.0 parts by mass |
| Titanium oxide fine particles surface-treated with isobutyltrimethoxysilane (BET: 80 $m^2/g$) | 1.0 parts by mass |
| strontium titanate | 0.5 parts by mass |

The above materials were mixed using a Henschel mixer (FM-75, manufactured by Mitsui Miike Machinery Co., Ltd)

at rotational speeds of 30 s$^{-1}$ and a rotational time of 10 min to obtain a toner 1 containing toner particles 1.

<Preparation of Toners 2 to 11>

Toners 2 to 11 containing the respective toner particles 2 to 11 were produced in the same manner as in the production of the toner 1 except that the toner base particle 1 was changed to the toner base particles 2 to 11, respectively.

The volume average particle diameter, the average shape factor, and the fine powder content of the obtained toner particles 1 to 11 were calculated and illustrated in the following table. The methods for calculating the volume average particle diameter, the average shape factor, and the fine powder content are as described above.

On the photoreceptor, a square partition region of four sides of the 1 cm was set, and the number of occurrences of toner filming in the region was counted.

(Evaluation Criterion)

AAA: 0 to 10 adhered substances (extremely excellent)

AA: 11 to 25 adhered substances (excellent)

A: 26 to 40 adhered substances (no practical problem)

B: 41 or more adhering substances (practically problematic)

The smaller the total number of occurrences of toner filming, the better, and the total number of occurrences of sticking of 40 or less was regarded as acceptable.

TABLE 1

| | | COMPOSITION OF SUPPORT [% BY MASS] | | | | | | | | | | | TONER | | | |
|---|---|---|---|---|---|---|---|---|---|---|---|---|---|---|---|---|
| | | | | | | | | | | | | | TONER PARTICLES | | | |
| | No. | Si | Al | Fe | Cu | Mn | Mg | Cr | Zn | Ti | No. | SHAPE FACTOR [—] | FINE POWDER CONTENT [% BY NUMBER] | VOLUME AVERAGE PARTICLE DIAMETER [μm] | STRONTIUM TITANATE |
| EXAMPLE 1 | 1 | 1.5 | 96.7 | 0.3 | 0.1 | 1 | 0.2 | 0.1 | 0 | 0.1 | 1 | 0.945 | 17 | 6.50 | PRESENT |
| EXAMPLE 2 | 2 | 0.63 | 97.72 | 0.3 | 0.05 | 1 | 0.1 | 0 | 0.1 | 0.1 | 1 | 0.945 | 17 | 6.50 | PRESENT |
| EXAMPLE 3 | 3 | 0.7 | 97.33 | 0.3 | 0.07 | 1 | 0.4 | 0 | 0.1 | 0.1 | 1 | 0.945 | 17 | 6.50 | PRESENT |
| EXAMPLE 4 | 4 | 0.8 | 96.6 | 0.3 | 0.2 | 1 | 0.9 | 0 | 0.1 | 0.1 | 1 | 0.945 | 17 | 6.50 | PRESENT |
| EXAMPLE 5 | 5 | 0.9 | 96.5 | 0.3 | 0.2 | 1 | 0.8 | 0.1 | 0.1 | 0.1 | 1 | 0.945 | 17 | 6.50 | PRESENT |
| EXAMPLE 6 | 6 | 1.1 | 96.4 | 0.4 | 0.2 | 1 | 0.7 | 0.1 | 0 | 0.1 | 1 | 0.945 | 17 | 6.50 | PRESENT |
| EXAMPLE 7 | 7 | 1.3 | 96.8 | 0.3 | 0.1 | 1.1 | 0.2 | 0.1 | 0 | 0.1 | 1 | 0.945 | 17 | 6.50 | PRESENT |
| EXAMPLE 8 | 8 | 2.0 | 95.9 | 0.4 | 0.2 | 1.2 | 0.2 | 0 | 0 | 0.1 | 1 | 0.945 | 17 | 6.50 | PRESENT |
| EXAMPLE 9 | 9 | 3.0 | 94.4 | 0.5 | 0.1 | 1.5 | 0.3 | 0 | 0.1 | 0.1 | 1 | 0.945 | 17 | 6.50 | PRESENT |
| EXAMPLE 10 | 10 | 12.6 | 85.2 | 0.4 | 0.2 | 1.3 | 0.1 | 0 | 0.1 | 0.1 | 1 | 0.945 | 17 | 6.50 | PRESENT |
| EXAMPLE 11 | 1 | 1.5 | 96.7 | 0.3 | 0.1 | 1 | 0.2 | 0.1 | 0 | 0.1 | 2 | 0.801 | 20 | 6.40 | PRESENT |
| EXAMPLE 12 | 1 | 1.5 | 96.7 | 0.3 | 0.1 | 1 | 0.2 | 0.1 | 0 | 0.1 | 3 | 0.970 | 16 | 6.50 | PRESENT |
| EXAMPLE 13 | 1 | 1.5 | 96.7 | 0.3 | 0.1 | 1 | 0.2 | 0.1 | 0 | 0.1 | 4 | 0.930 | 18 | 6.50 | PRESENT |
| EXAMPLE 14 | 1 | 1.5 | 96.7 | 0.3 | 0.1 | 1 | 0.2 | 0.1 | 0 | 0.1 | 5 | 0.949 | 5 | 6.60 | PRESENT |
| EXAMPLE 15 | 1 | 1.5 | 96.7 | 0.3 | 0.1 | 1 | 0.2 | 0.1 | 0 | 0.1 | 6 | 0.955 | 30 | 6.30 | PRESENT |
| EXAMPLE 16 | 1 | 1.5 | 96.7 | 0.3 | 0.1 | 1 | 0.2 | 0.1 | 0 | 0.1 | 1 | 0.945 | 17 | 6.50 | ABSENT |
| EXAMPLE 17 | 1 | 1.5 | 96.7 | 0.3 | 0.1 | 1 | 0.2 | 0.1 | 0 | 0.1 | 7 | 0.915 | 15 | 6.50 | PRESENT |
| COMPARATIVE EXAMPLE 1 | 11 | 18.0 | 80.3 | 0.2 | 0.2 | 1 | 0.1 | 0 | 0.1 | 0.1 | 1 | 0.945 | 17 | 6.50 | PRESENT |
| COMPARATIVE EXAMPLE 2 | 1 | 1.5 | 96.7 | 0.3 | 0.1 | 1 | 0.2 | 0.1 | 0 | 0.1 | 8 | 0.780 | 25 | 6.30 | PRESENT |
| COMPARATIVE EXAMPLE 3 | 1 | 1.5 | 96.7 | 0.3 | 0.1 | 1 | 0.2 | 0.1 | 0 | 0.1 | 9 | 0.985 | 6 | 6.60 | PRESENT |
| COMPARATIVE EXAMPLE 4 | 1 | 1.5 | 96.7 | 0.3 | 0.1 | 1 | 0.2 | 0.1 | 0 | 0.1 | 10 | 0.951 | 1 | 6.70 | PRESENT |
| COMPARATIVE EXAMPLE 5 | 1 | 1.5 | 96.7 | 0.3 | 0.1 | 1 | 0.2 | 0.1 | 0 | 0.1 | 11 | 0.932 | 43 | 6.20 | PRESENT |

<Preparation of Two component Developers 1 to 11>

Each of the toner particles and a ferrite carrier coated with an acrylic resin and having a volume average particle diameter of 34 μm were added and mixed so that the toner particle concentration was 6% by mass. Thus, two component developers 1 to 11 containing various toner particles were produced.

[Evaluation]<Cleaning Performance (Filming)>

A drum unit was disassembled in a bizhub C650i machine (manufactured by Konica Minolta, Inc), and each of the produced photoreceptors was replaced. Further, an image forming system was produced using each of the two component developers, and was mounted in a cyan color position of the machine.

An image chart having a cyan band-like solid patch of 15 mm wide in the conveyance direction and 290 mm wide in the direction perpendicular to the conveyance direction was actually printed on both sides of 200000 sheets of A4 paper.

TABLE II

| | EVALUATION ITEM FILMING | |
|---|---|---|
| | TOTAL NUMBER OF OCCURRENCES [PIECES] | EVALUATION |
| EXAMPLE 1 | 2 | AAA |
| EXAMPLE 2 | 3 | AAA |
| EXAMPLE 3 | 4 | AAA |
| EXAMPLE 4 | 5 | AAA |
| EXAMPLE 5 | 6 | AAA |
| EXAMPLE 6 | 6 | AAA |
| EXAMPLE 7 | 4 | AAA |
| EXAMPLE 8 | 10 | AAA |
| EXAMPLE 9 | 13 | AA |
| EXAMPLE 10 | 37 | A |
| EXAMPLE 11 | 26 | A |
| EXAMPLE 12 | 38 | A |
| EXAMPLE 13 | 14 | AA |

TABLE II-continued

| | EVALUATION ITEM FILMING | |
|---|---|---|
| | TOTAL NUMBER OF OCCURRENCES [PIECES] | EVALUATION |
| EXAMPLE 14 | 20 | AA |
| EXAMPLE 15 | 23 | AA |
| EXAMPLE 16 | 24 | AA |
| EXAMPLE 17 | 18 | AA |
| COMPARATIVE EXAMPLE 1 | 44 | B |
| COMPARATIVE EXAMPLE 2 | 41 | B |
| COMPARATIVE EXAMPLE 3 | 57 | B |
| COMPARATIVE EXAMPLE 4 | 45 | B |
| COMPARATIVE EXAMPLE 5 | 50 | B |

As illustrated in the results, it is found that the image forming method of the present invention can suppress the occurrence of toner filming and has good cleaning performance as compared with the comparative examples.

By the above means, it is possible to provide an image forming method and an image forming system capable of ensuring good cleaning performance even for a support made of aluminum containing a large amount of silicon.

The expression mechanism or action mechanism of the effect is not clear, but it is presumed as follows.

For the photoreceptor element tube, JIS3003 series and 6063 series wrought aluminum materials are often used. These are multi-element alloys containing silicon (Si), but the Si content of the 3003 series is 0.6% by mass or less, and the Si content of the 6063 series is in a range of 0.4 to 0.8% by mass.

It is considered that when the Si content in the aluminum base is in the range of more than 0.6% by mass and 12.6% by mass or less, crystals of Si are precipitated, the resistance value of the metal portion is increased, and the leakage of the charge of the toner can be suppressed. In addition, extensibility (malleability) is increased, and processing is facilitated.

However, when the content of Si in the aluminum base increases, as a general tendency, protrusions due to crystal growth are formed on the base surface. When the protrusion is formed, electric charge is concentrated on the protrusion, and charging and potential are lowered. As a result, an insulator having high chargeability, such as inorganic fine particles, which is an external additive, easily adheres to the protrusions. Next, the attached inorganic fine particles serve as nuclei, and thus developer components gradually attach and accumulate on the photoreceptor, resulting in cleaning failure and image defects.

Therefore, in the above embodiments, the shape factor and the content of the fine powder of the toner particles contained in the toner are specified to be within specific ranges. Thus, during cleaning, untransferred toner can stay between the cleaning blade and the photoreceptor, and the polishing force on the photoreceptor can be sufficiently exerted.

The reason why the shape factor of the toner particles is set in the range of 0.800 to 0.970 is as follows. When the shape factor is smaller than 0.800, the toner tends to be crushed due to the shape of the toner particle, and crushed components become a source of contamination, causing image defects. In addition, a low electrostatic adhesion amount of the toner causes fogging.

On the other hand, when the shape factor is higher than 0.970, the toner particle is too close to a spherical shape, so that the electrostatic adhesion force by point contact becomes high, the toner particle cannot stay between the cleaning blade and the photoreceptor, and the polishing effect is not exhibited.

Furthermore, the reason why the content of the fine powder is set in the range of 5 to 30% by number is as follows. When the content of the fine powder is less than 5% by number, the deposit formed by passing through the cleaning portion is not polished, and cleaning failure occurs, which causes an image defect. On the other hand, when the content of the fine powder is more than 30% by number, the amount of the external additive on the surface of the fine powder toner particle is relatively larger than the amount of the external additive on the surface of the toner particle near the average particle diameter. Therefore, the amount of the external additive brought into the cleaning portion by the fine toner particles increases, and the amount of components that easily pass through increases, which causes image defects.

From the above, the shape factor of the toner particles is set in a range of 0.800 to 0.970, and the fine powder content is set in a range of 5 to 30% by number.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming method comprising:
  developing, with an electrostatic charge image developing toner, a latent image formed on a photoreceptor in which a photosensitive layer is formed on a support containing aluminum as a main component;
  transferring a toner image on the photoreceptor onto a transfer target; and
  rubbing and removing the electrostatic charge image developing toner remaining on the photoreceptor after the transferring, wherein
  the support contains silicon in a range of more than 0.6% by mass and 12.6% by mass or less,
  a shape factor of toner particles included in the electrostatic charge image developing toner is in a range of 0.800 to 0.970, and
  a content of the toner particles having a particle diameter of 2 µm or less is in a range of 5% by number to 30% by number.

2. The image forming method according to claim 1, wherein the shape factor of the toner particles is in a range of 0.930 to 0.970.

3. The image forming method according to claim 1, wherein the toner particles contain strontium titanate.

4. The image forming method according to claim 1, wherein the support contains silicon in a range of 0.8% by mass to 12.6% by mass.

5. The image forming method according to claim 1, wherein the support contains silicon in a range of 1.3% by mass to 12.6% by mass.

6. The image forming method according to claim 1, wherein the support contains silicon in a range of 1.3% by mass to 2.0% by mass.

7. An image forming system comprising:
  a photoreceptor in which a photosensitive layer is formed on a support containing aluminum as a main component;

a developer that develops, with an electrostatic charge image developing toner, a latent image formed on the photoreceptor;

a transferer that transfers a toner image on the photoreceptor onto a transfer target; and a cleaner that rubs and removes the electrostatic charge image developing toner remaining on the photoreceptor after transferring; and an electrostatic charge image developing toner, wherein the support contains silicon in a range of more than 0.6% by mass and 12.6% by mass or less, a shape factor of toner particles included in the electrostatic charge image developing toner is in a range of 0.800 to 0.970, and a content of the toner particles having a particle diameter of 2 μm or less is in a range of 5% by number to 30% by number.

* * * * *